United States Patent
Chen et al.

(10) Patent No.: US 7,211,166 B2
(45) Date of Patent: May 1, 2007

(54) METHOD AND DEVICE FOR JOINING WORKPIECES MADE FROM PLASTIC IN THREE-DIMENSIONAL FORM BY MEANS OF A LASER BEAM

(75) Inventors: Jie-Wei Chen, Alpnach Dorf (CH); Adolf Niederberger, Kaegiswil (CH)

(73) Assignee: Leister Process Technologies, Sarnen (CH)

( * ) Notice: Subject to any disclaimer, the term of this patent is extended or adjusted under 35 U.S.C. 154(b) by 373 days.

(21) Appl. No.: 10/667,708

(22) Filed: Sep. 22, 2003

(65) Prior Publication Data
US 2004/0154737 A1 Aug. 12, 2004

(30) Foreign Application Priority Data
Oct. 2, 2002 (EP) .................... 02022073

(51) Int. Cl.
*B32B 37/10* (2006.01)
(52) U.S. Cl. .............. 156/272.8; 219/121.64; 219/121.66
(58) Field of Classification Search ............ 156/272.8; 219/121.65, 121.66, 121.78
See application file for complete search history.

(56) References Cited
U.S. PATENT DOCUMENTS
4,636,609 A * 1/1987 Nakamata ............ 219/121.64

FOREIGN PATENT DOCUMENTS
| | | |
|---|---|---|
| DE | 43 19 742 | 12/1994 |
| JP | 58163587 | 9/1983 |
| JP | 58166168 | 10/1983 |
| SE | 510 621 | 6/1999 |

OTHER PUBLICATIONS
Machine Translation of DE 4319742.*
Translation of DE 4319742.*

* cited by examiner

*Primary Examiner*—Richard Crispino
*Assistant Examiner*—Christopher T. Schatz
(74) *Attorney, Agent, or Firm*—Bachman & LaPointe, P.C.

(57) ABSTRACT

A method for joining workpieces made from plastic, the upper workpiece, facing a laser source, consisting of a material transparent to the laser beam, and the lower workpiece consisting of a material absorbent to the laser beam, such that the mutually bordering contact surfaces for the two workpieces melt and are joined to one another under pressure during a subsequent cooling, the guiding of the laser beam onto the site to be joined, and the mechanical compression of the workpieces being carried out simultaneously by a machining head. The corresponding device comprises a machining head with focussing devices for the laser beam onto the contact surface, and pressure-exerting devices for compressing the workpieces. A rotatably mounted glass ball or roller is particularly suitable as pressure-exerting device. The invention permits welding quality to be assured in conjunction with flexibility of the welding operation without expensive and complicated damping balls.

5 Claims, 4 Drawing Sheets

METHOD AND DEVICE FOR JOINING WORKPIECES MADE FROM PLASTIC IN THREE-DIMENSIONAL FORM BY MEANS OF A LASER BEAM

BACKGROUND OF THE INVENTION

The present invention relates to a method and a device for joining workpieces made from plastic, the upper workpiece, facing a laser source, consisting of a material transparent to the laser beam, and the lower workpiece consisting of a material absorbent to the laser beam, such that the mutually bordering contact surfaces for the two workpieces melt and are joined to one another under pressure during a subsequent cooling.

Generally, methods for welding plastics with the aid of a laser beam are known and referred to as transmission welding. It is important for these plastics welding methods that the workpieces are clamped to one another during the welding operation, since an important precondition for a good welded joint of the plastics by means of laser radiation is not only the energy dosing, but also the clean and mechanical contact between the two joint surfaces to be connected to one another. Various methods and devices which permit an adequate contact pressure, in particular with flat parts, are known for the purpose.

It is relatively easy to produce a good clamping condition two-dimensional welding contours. However, as soon as a welding contour is to be set up in three-dimensional form on three-dimensional parts, the mechanical contact of the parts that are to be joined to one another is very difficult to realize technically, particularly when the shape of the parts keeps changing. Both the uniform distribution of the clamping force over the entire contour, and the dosing of the clamping pressure are problematic in this regard.

It is therefore the object of the present invention to propose a possibility which permits contour welding of workpieces made of plastic in three-dimensional form without a special clamping device.

SUMMARY OF THE INVENTION

The object is achieved according to the invention by means of a method and a device having the features of the independent method claim and of the device claim. Further advantageous refinements are specified in the respective subclaims that refer back.

In accordance with the method according to the invention, the guiding of the laser beam onto the site to be joined, and the mechanical compression of the workpieces are carried out simultaneously by a machining head. In this case, the compression of the workpieces can occur either in punctiform fashion precisely at the site at which the laser beam impinges, or else two-dimensionally in a region about the point of impingement of a laser. It is also possible to compress the workpieces along a line transverse to the relative movement of the laser beam and workpieces, on which the laser beam is also located.

The invention thereby renders it possible in principle to supply the required clamping force simultaneously with the laser beam along a programmed welding contour in continuous, but always punctiform, fashion along a line or in a specific region at the point at which the welding process takes place, and at which the clamping force is actually required. This special welding and pressing function is transmitted via a machining head that permits the mechanical pressure and also the energy transmission.

Since, in accordance with the invention, the relative movement between the machining head and the workpieces to be welded proceeds at all times with mechanical contact, the workpieces are preferably compressed at the point of impingement of the laser, the laser beam advantageously being focused onto the contact surface via a transparent ball or roller, for example made from glass or plastic, that is expediently rotatable and transparent to IR radiation. The ball can be rotated in all directions in order to prevent unnecessary mechanical friction. This rotatable ball, which is pressed at all times against the upper workpiece, behaves in this case also like a lens, using which the laser beam can be focused precisely onto the contact site. A roller can be moved over the surface in order to weld a line, in particular a straight line, or a wide line (strip) on a corrugated surface. In this case, the laser beam can itself impinge as a line in the predirection or transverse to the feed direction. The focal plane of the laser beam is preferably set by means of a lens system integrated into the machining head.

The movement of this machining head as related to the speed of movement, the type of movement and the holding of the head can be controlled precisely by a robot system. The desired clamping force can be defined by a programmable robot position. Minimal shape-related deviations are balanced out via a spring body integrated in the machining head. The real pressure force is regulated by the measurement of the torque inside the robot system.

In accordance with a preferred refinement of the method, the welding method is implemented in two steps in such a way that in a first step the workpieces are fixed at one or more defined sites by punctiform welding with the aid of the machining head, and the contour is carried along for the entire joint in a second step. This obviates the need for additional mechanical fixings that are difficult and complicated to implement. A further advantage of the first step resides in the fact that, particularly in the case of thin materials, a material deformation of the workpieces during the 3D contour welding may entail accompanying movement of the workpieces to be welded that is undesired as regards the accuracy of the welding operation. In terms of method, the upper workpiece can be positioned by means of a second robot system before the spot welding. Holding the machining head during the method is extremely important for the welding quality. With regard to functions of the mechanical pressure and the targeted energy transmission, the machining head must always be held perpendicular to the contact plane. This special holding can be programmed precisely by a multiaxial robot system.

The device according to the invention comprises the machining head devices for focusing the laser beam onto the contact surface and pressure-exerting devices for compressing the workpieces. The machining head preferably has a cavity into which the end of an optical fiber projects for coupling in the laser beam. Located in the cavity are optical devices for shaping and for guiding the laser beam. The transparent ball or roller is rotatably mounted at its lower end. A thermometer, or a pyrometer, can advantageously be coupled into the machining head.

The invention thus ensures the welding quality in conjunction with three-dimensional arrangements, and simultaneously permits a high degree of flexibility during different welding operations without expensive and complicated clamping tools.

BRIEF DESCRIPTION OF THE DRAWINGS

The invention is explained in more detail below with the aid of exemplary embodiments. In the drawings.

DETAILED DESCRIPTION

Figure 1:
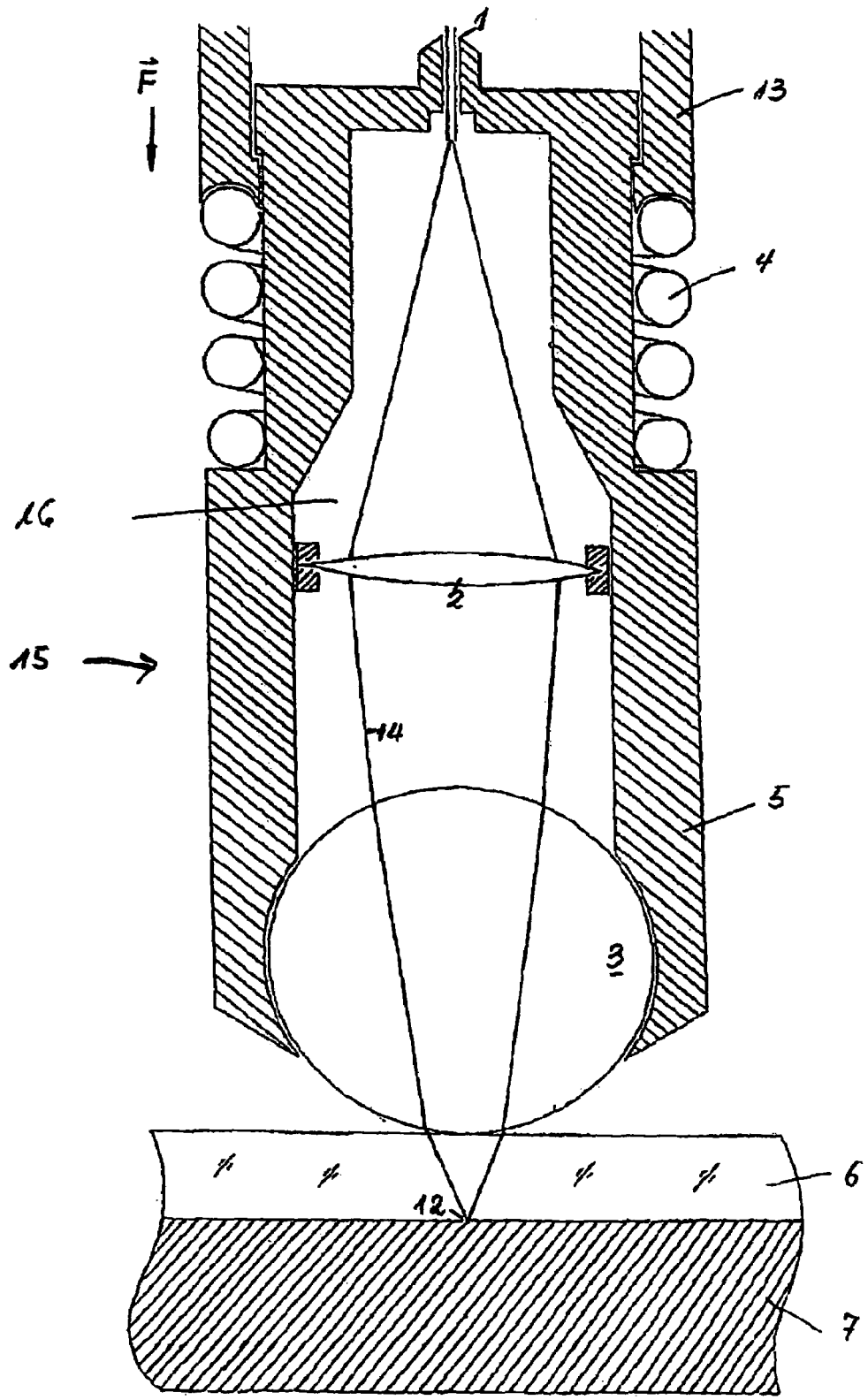
FIG. 1 shows a sectional illustration through the machining head and the workpieces to be machined.

FIG. 1 shows the machining head 15 with a mechanical mount 5 that encloses a cavity 16. In the exemplary embodiment, the cavity 16 extends in the longitudinal direction of the mechanical mount 5. A laser beam 14 passes into this cavity at the upper end of the mechanical mount 5 via an optical fiber 1. Located in the cavity is a convergent lens 2 and, at the lower end, a glass ball 3. The glass ball 3 is mounted rotatably in all directions in the mechanical mount and passes in the exemplary embodiment onto the top side of the workpiece 6, which is transparent to the laser beam 14. The convergent lens 2 and the glass ball 3 focus the laser beam 14 at the point of impingement 12 between the transparent workpiece 6 and the absorbing workpiece 7. The mechanical mount 5 is mounted at the upper end in a cylindrical guide, the force being applied via a spring arrangement 4 upon movement of cylindrical guide 13 in the direction of the workpieces 6, 7. The mechanical tolerances thereby compensate. It is also possible in principle to integrate a cleaning mechanism in the mount for the glass ball 3, in order to be able to ensure the optical function of the glass ball 3 over a lengthy time, as well.

Such a machining head can be of very compact design, since only one convergent lens 2 is required. Adjusting the focal plane can be achieved solely by varying the position of the convergent lens. If the radiated surface on the glass ball 3 is substantially smaller than the diameter of the glass ball 3, the focal plane is chiefly determined by the focal length of the convergent lens 2.

Figure 2:
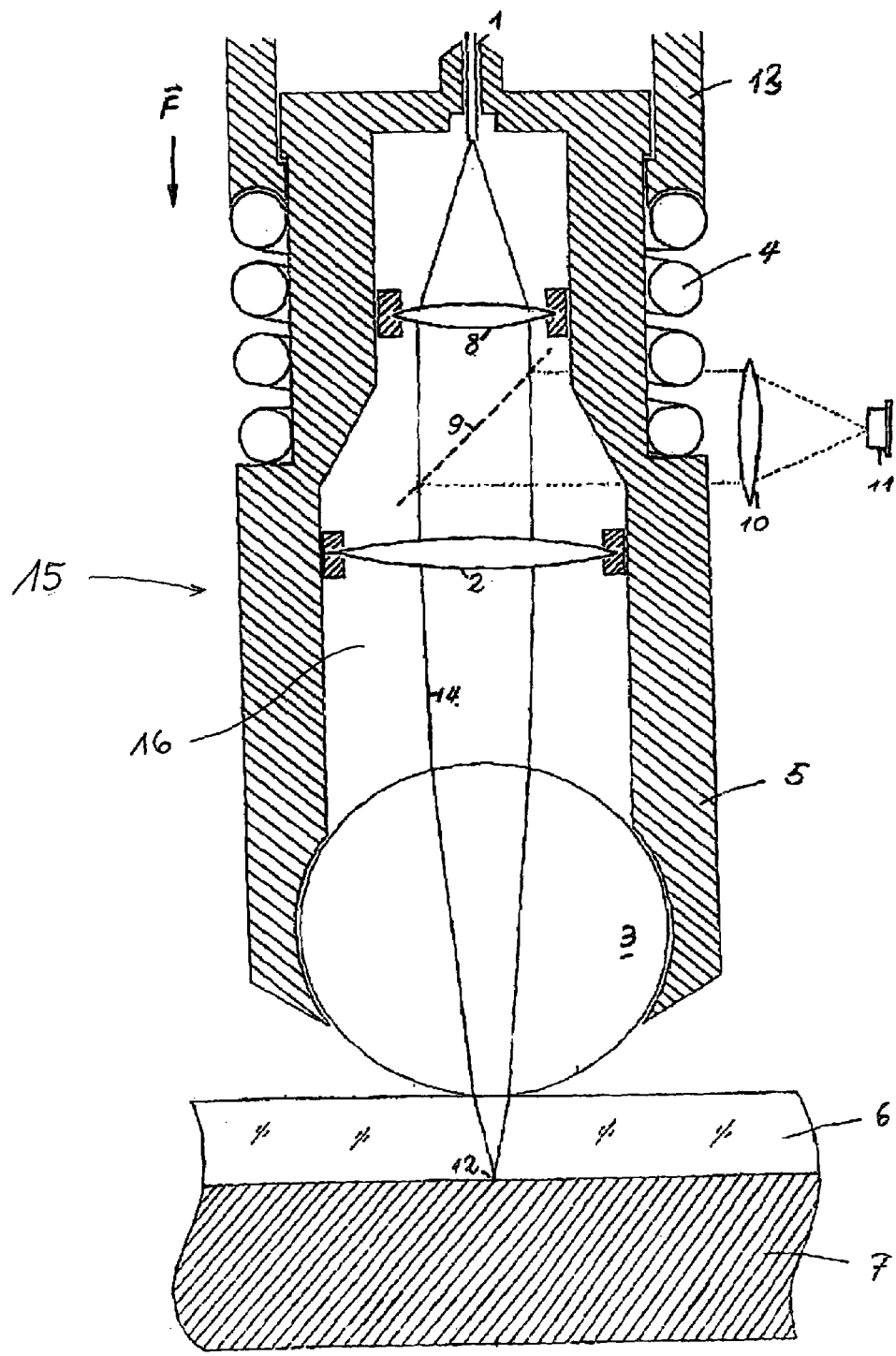
FIG. 2 shows another configuration corresponding to FIG. 1, with an additional possibility of temperature measurement.

FIG. 2 shows a machining head 15 with an additional temperature monitoring system. Located in this case in the cavity 16 is a further convergent lens 8. The latter is required in order to be able to produce a collimated beam path so that further optical elements can be coupled in. The collimated radiation downstream of the converted lens 8 is focused onto the point of impingement 12 below the glass ball 3 by means of the convergent lens 2. The thermal radiation from the welding site is deflected by a beam portion that is located in the collimated beam path via the beam splitter 9, and focused onto a pyrometer 11 via the convergent lens 10 arranged outside the mechanical mount.

Figure 3:
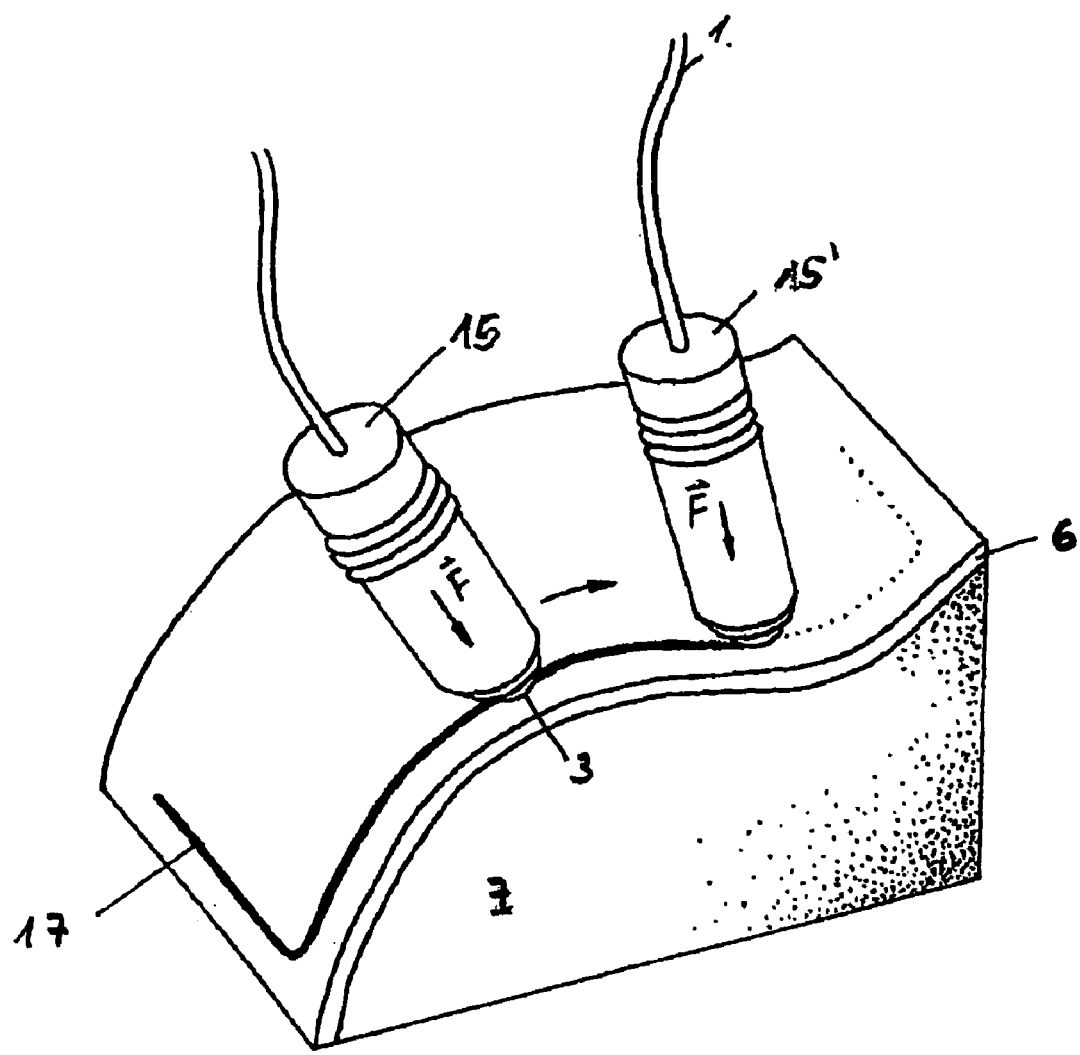
FIG. 3 shows an illustration of the principle of the 3D welding method with the aid of a robot, and the holding of the machining head during the welding method.

FIG. 3 illustrates a principle of the 3D welding operation with two different positions of the machining head 15, which is guided along a weld seam 17 on two differently designed, non-planar workpieces 6,7 and in the process the transparent workpiece 6 against the absorbing workpiece 7 at the point of contact by means of the glass ball 3. The direction of movement of the machining head 15 is illustrated by the arrow, and F shows the direction of the acting force, two different positions of the machining head 15 in the figure showing that the machining head 15 must always be pressed perpendicularly onto the surface. Thus, the position of the machining head 15 differs from that of the machining head 15', and the machining head 15 is guided, as already mentioned above, by means of the corresponding robot system.

Figure 4:
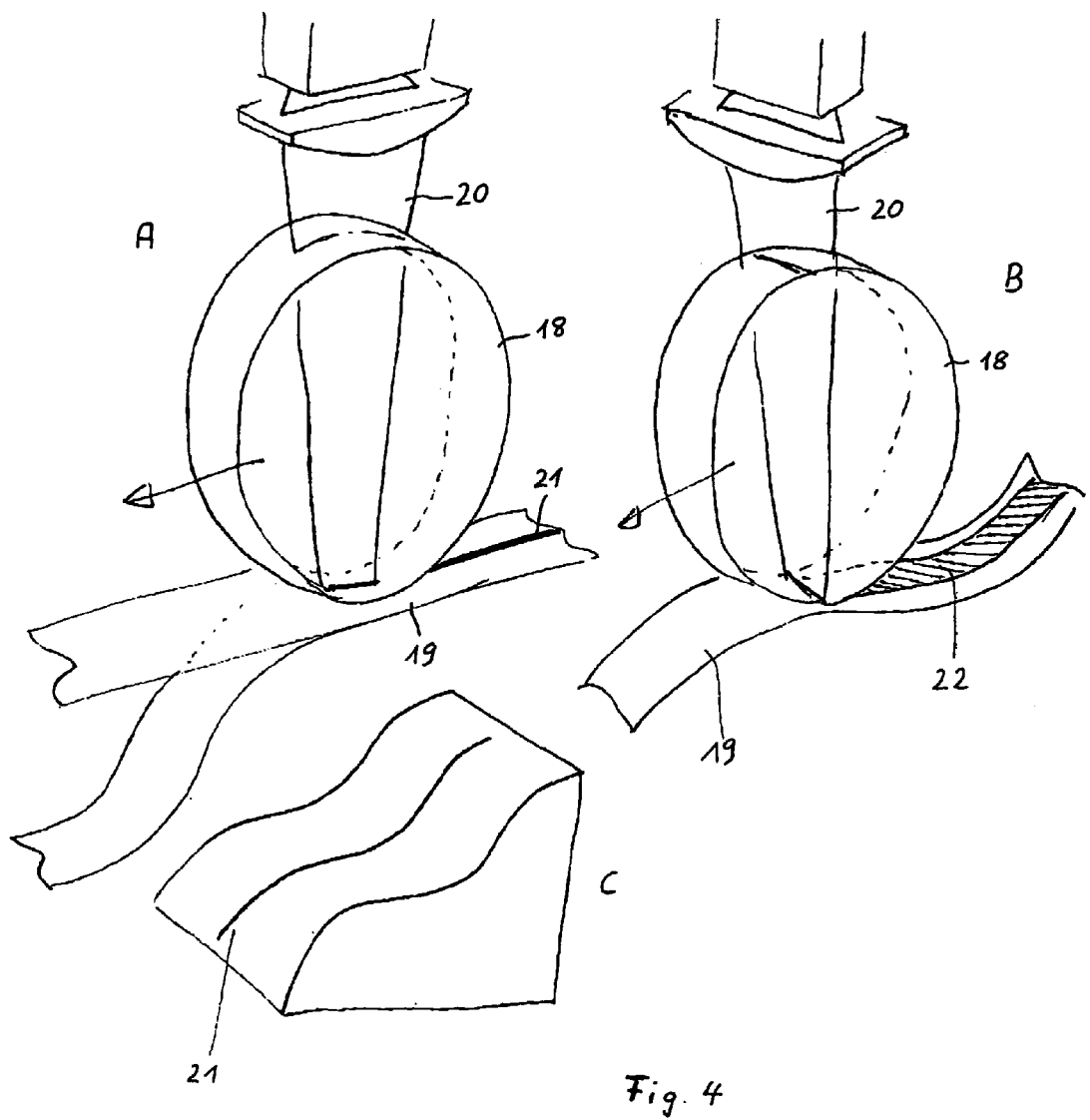
FIG. 4 shows the principle of the arrangement of a roller on workpieces to be welded, with reference to the example of films with a linear laser beam in the feed direction (FIG. 4A), with a linear laser beam transverse to the feed direction (FIG. 4B), as well as the corrugated contour (FIG. 4C).

FIG. 4A shows a roller 18 that is transparent to IR radiation and can be moved in the direction of the arrow over the material 19 to be welded. In this exemplary embodiment, the laser beam 20 is linear and is adapted as regards length to the curvature of the roller 18 in the region of impingement. Consequently, a narrow weld seam line 21 can be produced along a corrugated contour, as shown in FIG. 3. It is advantageous, as well, that the laser beam is perpendicular to the surface. In FIG. 4B, the laser beam 20 is rotated by 90° such that a substantially wider weld seam 22 is produced. In both cases, the upper material is compressed along a line arranged transverse to the feed direction, which is the line of contact of the roller 18 with the material 19. However, the roller 18 can also be made from solid material or else be tubular. The laser beam 20 is shaped in a known way by means of a suitable lens 22 into a curtain-like laser beam with a line of impingement. The arrangement in accordance with this figure is arranged in a machining head as illustrated in FIG. 1 or 2, and the roller 18 is correspondingly rotatably mounted.

The invention claimed is:

1. A method for joining two workpieces made from plastic, comprising providing a laser source for emitting a laser beam, providing an upper workpiece, comprising a material transparent to the laser beam, providing a lower workpiece, comprising a material absorbent to the laser beam, wherein mutually bordering contact surfaces for the two workpieces are melted under the effect of the laser beam and joined to one another under pressure and subsequent cooling, providing a machining head having a rotatably mounted transparent pressure element and pressing the transparent pressure element onto the upper workpiece showing a three-dimensional shaped touch surface for the transparent pressure element facing the machining head wherein a mechanical compression of the workpieces by the transparent pressure element and a guiding of the laser beam are accomplished simultaneously with a three-dimensional motion of the machining head and a dosage of the compression being exerted to the upper workpiece by the machining head.

2. The method as claimed in claim 1, wherein the mechanical compression of the workpieces occurs either punctually exactly at a point of infringement where the laser beam hits the contact surfaces or in a region around the point.

3. The method as claimed in claim 1, wherein the machining head is moved along a line or a contour to be welded on the three-dimensional shaped touch surface of the upper workpiece while touching the upper workpiece.

4. The method as claimed in claim 1, wherein a focal plane of the machining head is determined by an IR-transparent pressure element and an integrated lens system and is set by the integrated lens system.

5. The method as claimed in claim 2 or 3, wherein the workpieces are fixed in a first step at one or more defined points with the aid of the machining head and subsequently a line or a contour to be welded is traveled along during a second step.

* * * * *